(12) United States Patent
Cox (10) Patent No.: US 7,004,045 B2
(45) Date of Patent: Feb. 28, 2006

(54) HIGH THRUST VALVE OPERATOR

(75) Inventor: Ted Ernest Cox, Wylie, TX (US)

(73) Assignee: Minarik Corporation, Glendale, CA (US)

( * ) Notice: Subject to any disclaimer, the term of this patent is extended or adjusted under 35 U.S.C. 154(b) by 0 days.

(21) Appl. No.: 10/270,269

(22) Filed: Oct. 11, 2002

(65) Prior Publication Data

US 2004/0244515 A1 Dec. 9, 2004

(51) Int. Cl.
*F16H 1/18* (2006.01)

(52) U.S. Cl. .............. 74/424.92; 74/424.91; 251/264; 251/266

(58) Field of Classification Search ............ 74/742.91, 74/742.92, 424.91, 424.92; 251/248, 250.5, 251/264–278
See application file for complete search history.

(56) References Cited

U.S. PATENT DOCUMENTS

| 3,178,957 | A | * | 4/1965 | Martens | 74/424.92 |
|---|---|---|---|---|---|
| 3,861,221 | A | * | 1/1975 | Stanley | 74/25 |
| 4,579,012 | A | * | 4/1986 | Mabie et al. | 74/89.34 |
| 4,603,616 | A | * | 8/1986 | Zajac | 92/33 |
| 4,741,250 | A | * | 5/1988 | Weyer | 92/33 |
| 4,760,867 | A | * | 8/1988 | Takahashi | 137/637 |
| 5,421,232 | A | * | 6/1995 | Laverick | 83/699.21 |
| 5,529,531 | A | * | 6/1996 | Kaiser et al. | 451/307 |
| 5,557,154 | A | * | 9/1996 | Erhart | 310/80 |
| 6,074,170 | A | * | 6/2000 | Bert et al. | 417/44.2 |
| 6,131,479 | A | * | 10/2000 | Butsch et al. | 74/424.92 |
| 6,230,855 | B1 | * | 5/2001 | Holding | 188/158 |
| 6,420,808 | B1 | * | 7/2002 | Hosle | 310/83 |

* cited by examiner

*Primary Examiner*—David Fenstermacher
(74) *Attorney, Agent, or Firm*—Felix L. Fischer (57) ABSTRACT

A high thrust operator for gate valves employs an inverted satellite roller screw assembly driven by an internally threaded cylinder carried within a bearing case. The cylinder is sized to provide a relief plenum within the case into which the roller screw assembly can be over extended to expose tool engagement flats for attachment and release of a mating stem in the valve gate actuator.

12 Claims, 8 Drawing Sheets

FIG. 6

HIGH THRUST VALVE OPERATOR

BACKGROUND OF THE INVENTION

1. Field of the Invention

This invention relates generally to the field of high load equipment actuators and, more particularly, to a high thrust linear actuator employing a satellite roller screw as a manual operator for large diameter valves in oilfield, gas and process flow applications.

2. Description of the Related Art

High thrust operators for large valves traditionally use high friction acme screws to actuate the high pressure valve gate. Typical systems employ very low efficiency acme screws with some form of right angle bevel or worm gear arrangement for mechanical advantage. High torque caused by friction in the lead screw nut is ameliorated to some extent through the use of worm gear reducers. However, while reducing torque, these units increase the number of revolutions of the operator required to close the valve. As an example, an acme screw with a 0.25 inch lead and 45% efficiency at 100,000 lbs thrust requires 8,842 in-lbs of torque. A 60:1 worm gearbox reduces torque to a manageable 147 in-lbs; however, the hand wheel must be operated at 90 degrees to the axis of the valve and the field technician would be required to turn the wheel 2,400 revolutions on the operator to obtain a 10 inch travel on the actuator.

Improved efficiency over the lead screw has been accomplished through the use of recirculating ball screws. A dramatic improvement in mechanical efficiency to approximately 92% is achievable. However, the load capacity of the ball screw is dramatically lower than a lead screw, requiring a very large diameter screw. Additionally, the ball screw design cannot be inverted resulting in an increase in the overall length of the operator. Alternatively, the screw stem extends through the operating wheel for the valve, advancing into the technician's face as the wheel is turned.

It is therefore desirable to have an operator design which reduces the number of required revolutions of the hand wheel to actuate the valve while maintaining high efficiency to reduce the load to a manageable level.

It is further desirable to employ an inverted design to allow reduction in the length of the operator for packaging efficiency while avoiding a 90 degree offset for the hand wheel.

SUMMARY OF THE INVENTION

The present invention provides a high thrust valve operator with a bearing housing having a rear flange and a front flange carrying a cylinder having a threaded internal surface. The cylinder is sized to provide a relief plenum from the front flange for operation of a roller screw assembly engaging the threaded internal surface of the cylinder. A roller rod carried by the roller screw assembly extends through an aperture in the front flange and the roller screw assembly is movable from an over extended position, with encroachment into the relief plenum, to an initial extended position and further movable to a fully retracted position by rotation of the cylinder. An input shaft received through an aperture in the rear flange engages the cylinder for rotation.

BRIEF DESCRIPTION OF THE DRAWINGS

These and other features and advantages of the present invention will be better understood by reference to the following detailed description when considered in connection with the accompanying drawings wherein:

FIG. 4b is an end view of the roller rod employed in the embodiment of FIG. 4a;

FIG. 6 is an isometric cutaway view of the embodiment of FIG. 5a.

DETAILED DESCRIPTION OF THE INVENTION

Figure 1:
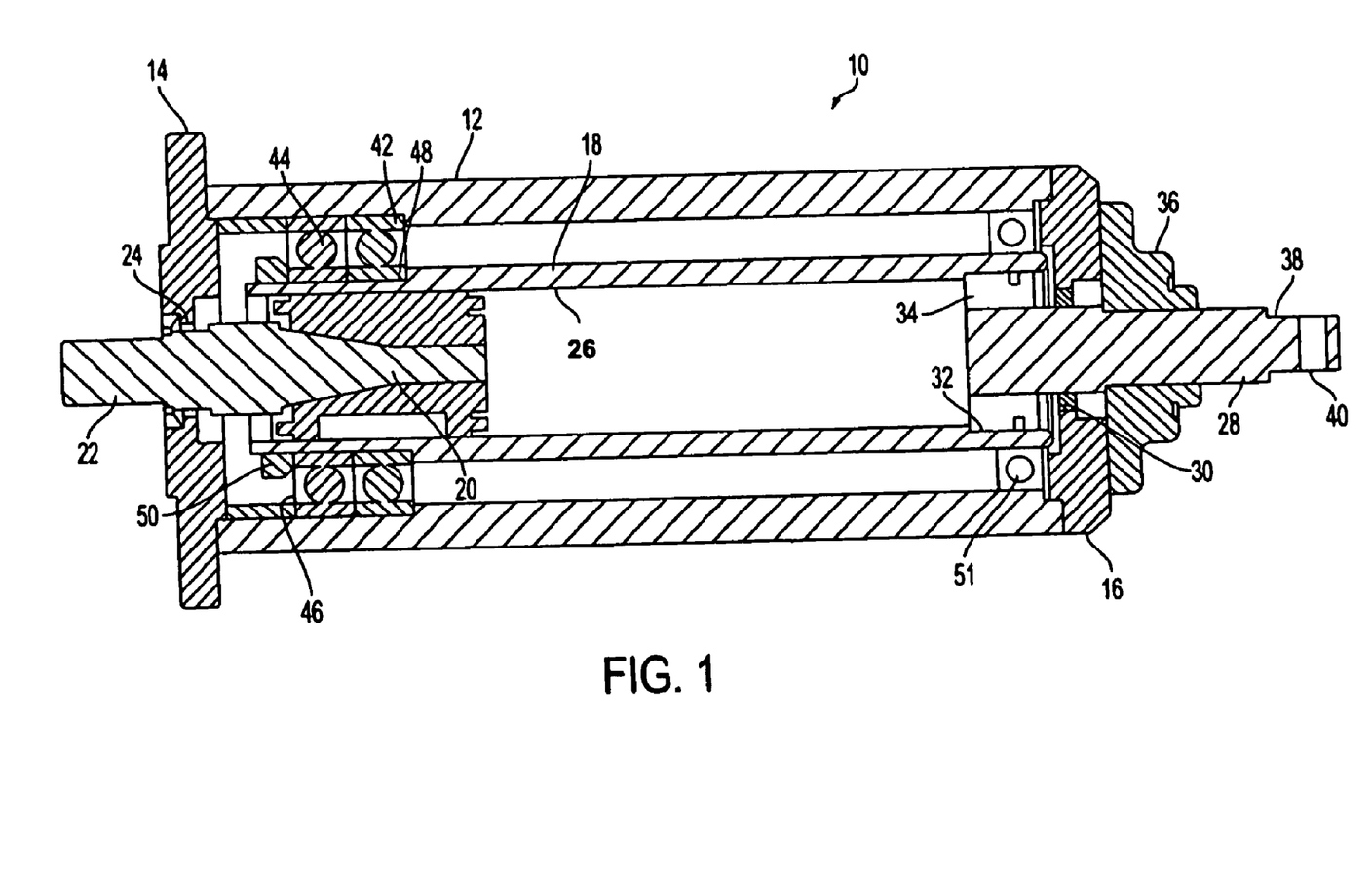
FIG. 1 is a section view of a first embodiment of an operator employing the present invention.

Referring to the drawings, FIG. 1 shows a first embodiment of the invention. The operator 10 includes a bearing case 12 with a front flange 14 and rear flange 16. Carried within the bearing case is an inverted satellite roller screw as the operating element having a cylinder 18 and a roller screw assembly 20. A roller rod 22 is carried by the roller screw assembly and extends through an aperture 24 in the front flange to engage a mating stem on the valve gate positioner. The cylinder has a first threaded portion 26 of the internal surface which engages the satellite rollers as will be discussed greater detail subsequently.

In the embodiment shown in FIG. 1, an input shaft 28 extends through an aperture 30 in the rear flange which is concentric with the cylinder and engages the cylinder in a second attachment portion 32 using a keyless shrink disc locking device 34 such as those produced by B-LOC Corporation of Monroe, N.Y. In alternative embodiments, a keyed mating plug receiving the input shaft and closely received by the internal surface of the cylinder with opposing key slots to secure rotational engagement is used. An input bearing cap 36 carries the input shaft and attachment of a manual actuator wheel (not shown) is accommodated by flats 38 and securing bore 40.

The cylinder is supported in the bearing case by ball bearing assemblies 42 carrying balls 44 in races 46 which engage the cylinder on a first race land 48 in the embodiment shown. A thrust collar 50 threaded onto the external surface of the cylinder reacts the thrust load on the bearing races by the cylinder in conjunction with the shoulder of the land. A second bearing assembly 51 for radial loads is located at the opposite end of the cylinder.

The embodiment of FIG. 1 has been demonstrated in applications of high load valve operators requiring 50,000 lbs. thrust for actuation. The ability of the inverted satellite roller screw incorporated in the present invention to draw the mating stem of the valve gate actuator into the operator reduces the overall operator length by at least the operating stroke length of 9.25 inches. Torque required by the operator is approximately 205 ft-lbs to achieve the 50,000 lbs of thrust.

Figure 2:
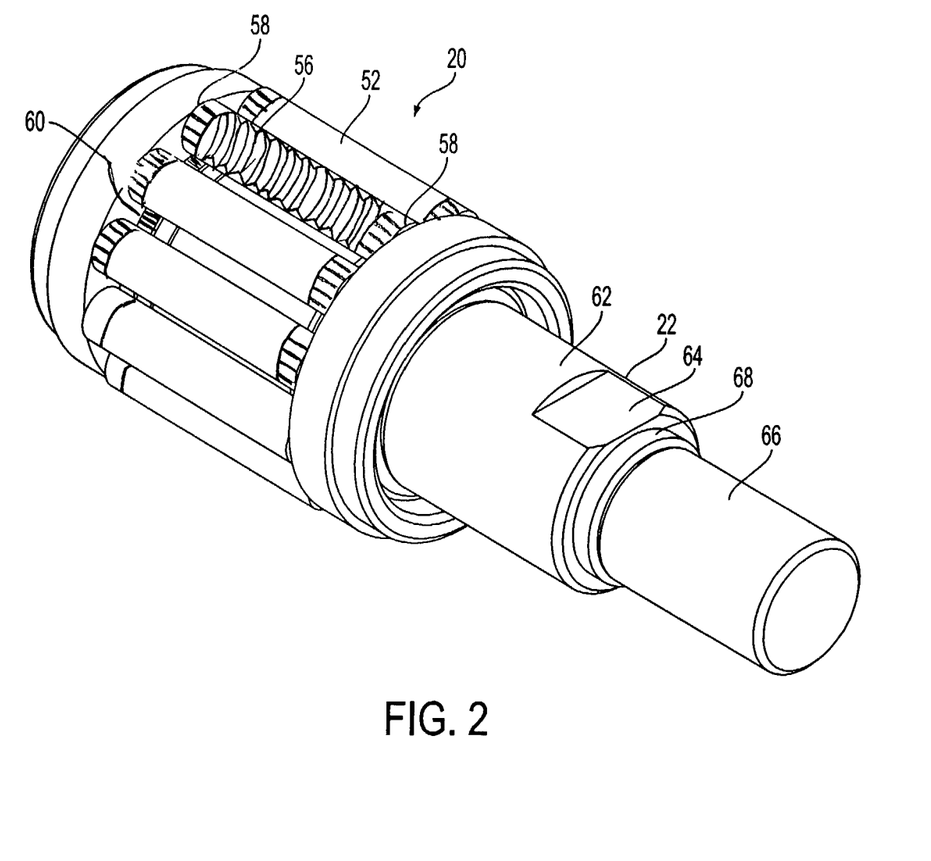
FIG. 2 is an isometric view of the satellite roller screw assembly of the inverted roller screw.

The roller screw assembly employed in the present invention is shown in FIG. 2. Satellite rollers 52 are carried on a roller assembly core 54. Each satellite roller has a threaded portion 56 and synchronization gears 58. The threads engage the internal thread on the cylinder for creating translational motion of the roller screw assembly within the cylinder upon rotation of the cylinder. The core incorporates master synchronization gears 60 which engage the synchronization gears on each satellite roller to assure coordinated rotation by the satellite rollers. The roller rod 22 includes a first body portion 62 which incorporates wrench flats 64 to assist in attachment of the mating stem in the valve gate mechanism. A threaded head portion 66 on the roller rod engages the mating stem and a precision pilot land 68 engages a pilot bore in the mating stem to assure alignment and concentricity of the stem with the operator.

Figure 3:
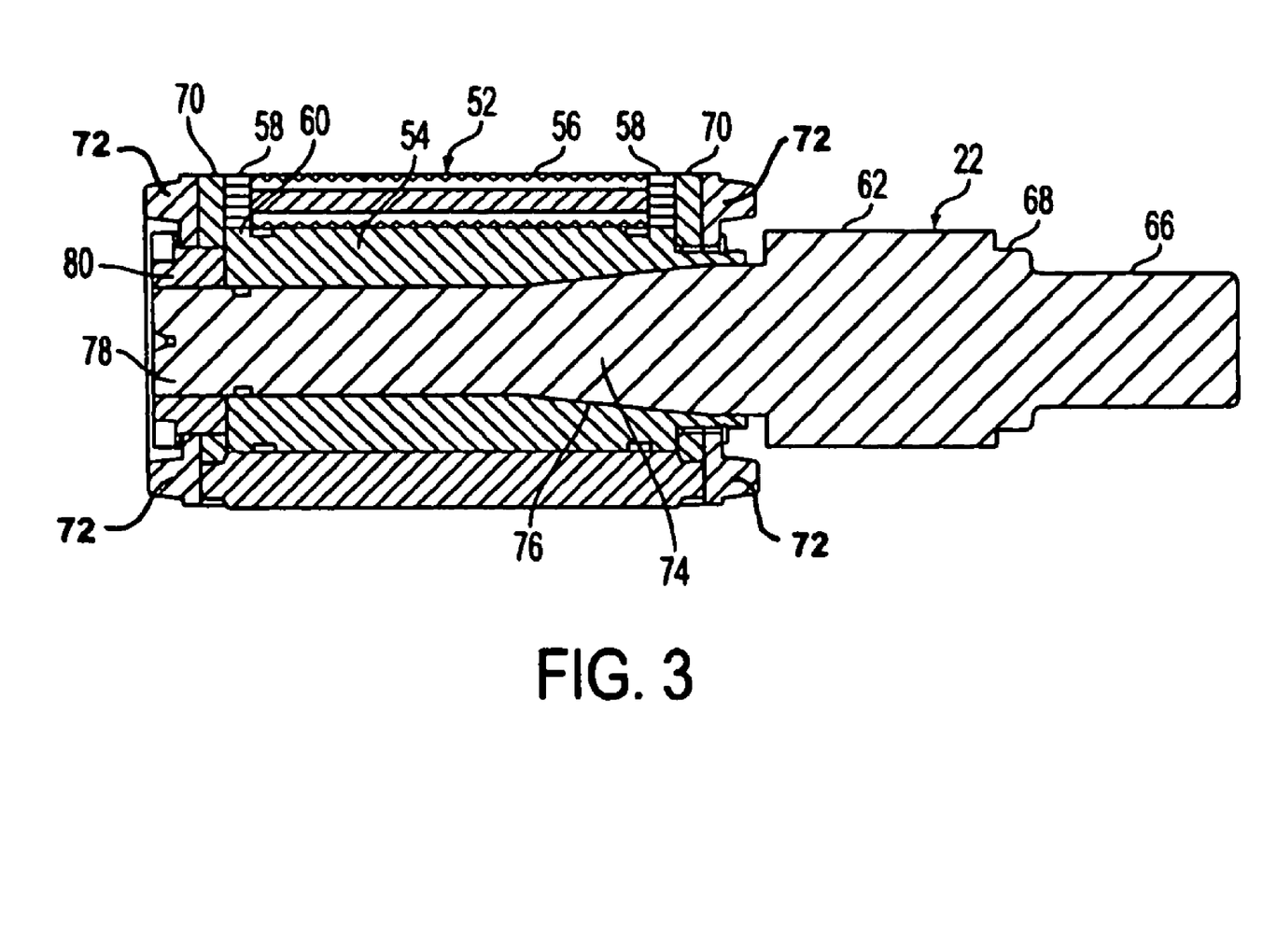
FIG. 3 is a sectional view of a first embodiment of the satellite roller screw assembly with a tapered roller rod.

A sectional view for internal detail for a first embodiment of the roller screw assembly is shown in FIG. 3. The satellite rollers are carried by engagement flanges 70 at each end which are secured by caps 72. As previously described, the rollers incorporate synchronization gears 58 which engage master synchronization gears 60 on the core 54. For the embodiment shown in this drawing, the roller rod incorporates a tapered shaft body 74 which engages a matching tapered bore 76 in the core. The roller rod terminates in a second threaded end 78 which is engaged by a tensioning nut 80. Frictional engagement of the tapered shaft and bore prevents rotational motion of the roller rod during actuation of the operator.

Figure 4A:
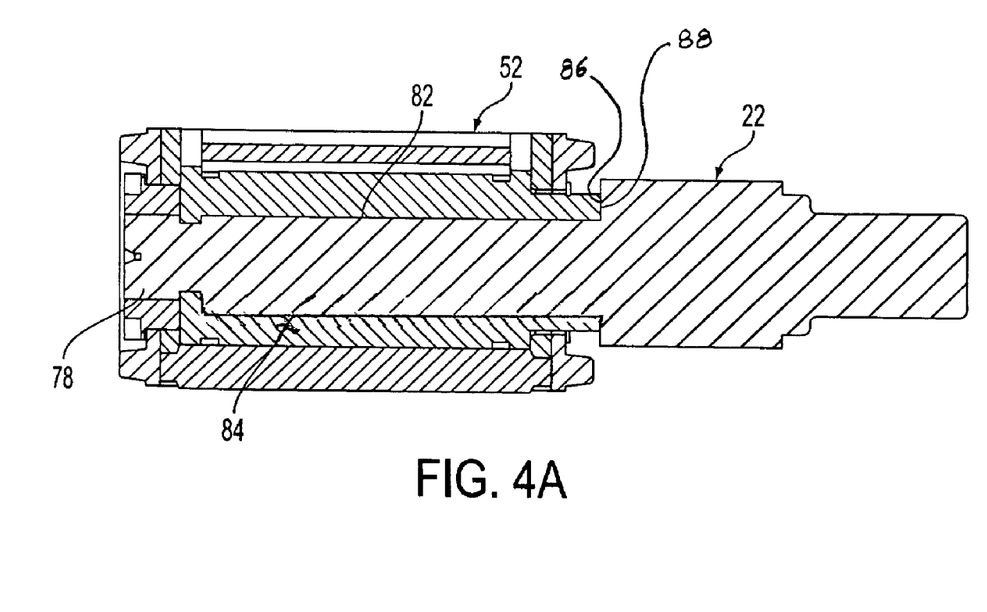
FIG. 4a is a sectional view of a second embodiment of the satellite roller screw assembly with a D-section roller rod.
Figure 4B:
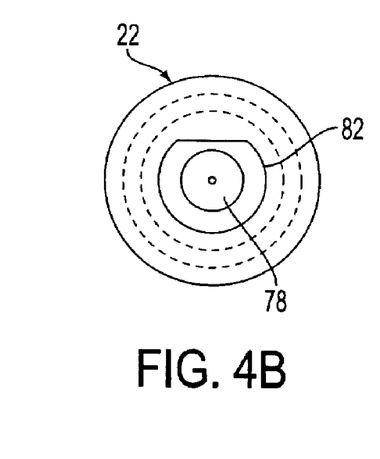

FIG. 4a shows a second embodiment of the roller screw assembly with the shaft body of the roller rod incorporating a D-section 82 received in a mating D-section bore 84 in the core to resist rotation of the roller rod during actuation of the operator. The shoulder 86 of the first body portion of the roller rod engages the core face 88 to react the tension in the roller rod created by the tensioning nut. FIG. 4b is an end view of the roller rod demonstrating the shape of the D-section.

A second higher thrust capability embodiment of an operator incorporating the present invention is shown in FIGS. 5a, 5b, 5c and 6. This embodiment employs a roller screw assembly of substantially identical form to the earlier disclosed embodiment and identification of elements for purposes of the disclosure is maintained. Those skilled in the art will recognize necessary dimensional adjustments of the elements required for altered thrust loading capabilities of the various embodiments.

Figure 5A:
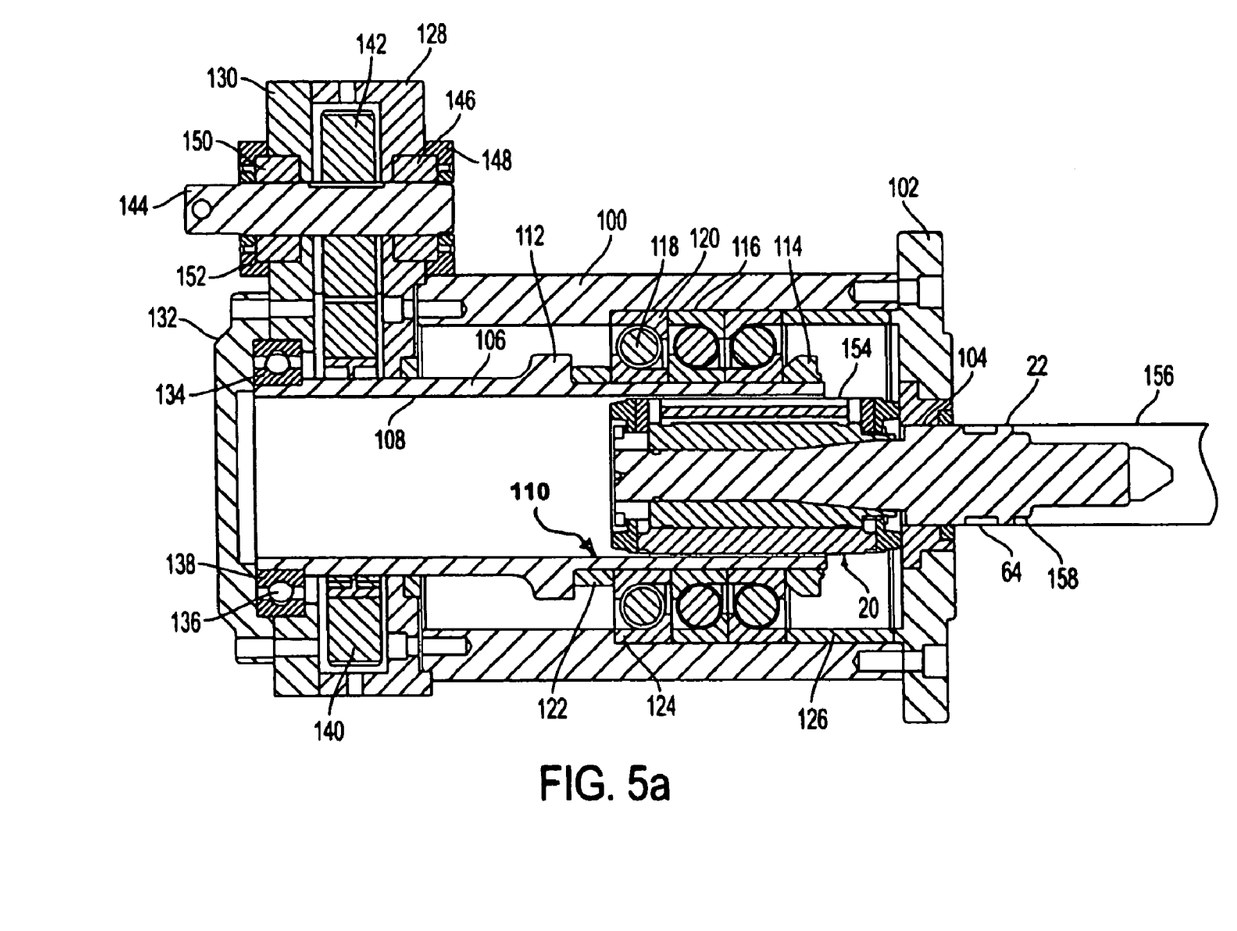
FIG. 5a is a section view of a second embodiment of an operator employing the invention with a spur gear arrangement attached to the input shaft.

Turning to FIG. 5a, this embodiment of the inventive operator has a bearing case 100 with a front flange 102 having an aperture 104 through which the roller rod extends and the mating stem is received during actuation. The cylinder 106 receiving the roller screw assembly 20 has a threaded internal surface 108 to engage the threads on the individual satellite rollers 52. The cylinder incorporates a front bearing portion 110 which employs a thrust reaction shoulder 112 and a thrust reaction collar 114 which is threaded onto the outer diameter of the cylinder. Ball bearing assemblies 116 carrying balls 118 in races 120 are secured between the shoulder and collar on the cylinder with a first bearing spacer 122. The bearing case reacts the bearing thrust loads against an outer shoulder 124 and a second bearing spacer 126 secured by the front flange.

In the second embodiment, the simple rear flange of the first embodiment is replaced with a gear box 128 having a rectangular end plate 130 and a circular end flange 132. A rear bearing 134 having balls 136 and a race 138 is received in a cutout in the end plate and secured by the end flange, engaging the cylinder at the end opposite from the front bearing collar. A cylinder spur gear 140 engages the cylinder through the use of a splined or keyed interface or, alternatively, using a keyless shrink disc locking device as shown and previously described. The cylinder spur gear extends from the cylinder intermediate the front and rear bearings for balanced drive on the cylinder. An input spur gear 142 is driven by the input shaft 144 which is carried by a front bearing box 146 and front cap 148 and a rear bearing box 150 and rear cap 152. For the embodiment shown, a keyed engagement for the input spur gear and input shaft is employed.

The cylinder is sized with a length providing a relief plenum 154 in between the cylinder and front flange. As shown in FIG. 5a, the roller screw assembly 20 can be over extended, encroaching into the relief plenum thereby extending the roller rod to expose the first body portion 22 having wrench flats 64 to allow assembly of the operator and mating stem 156. As previously described, the roller rod includes a precision pilot land and the mating stem incorporates a matching pilot bore 158.

Figure 5B:
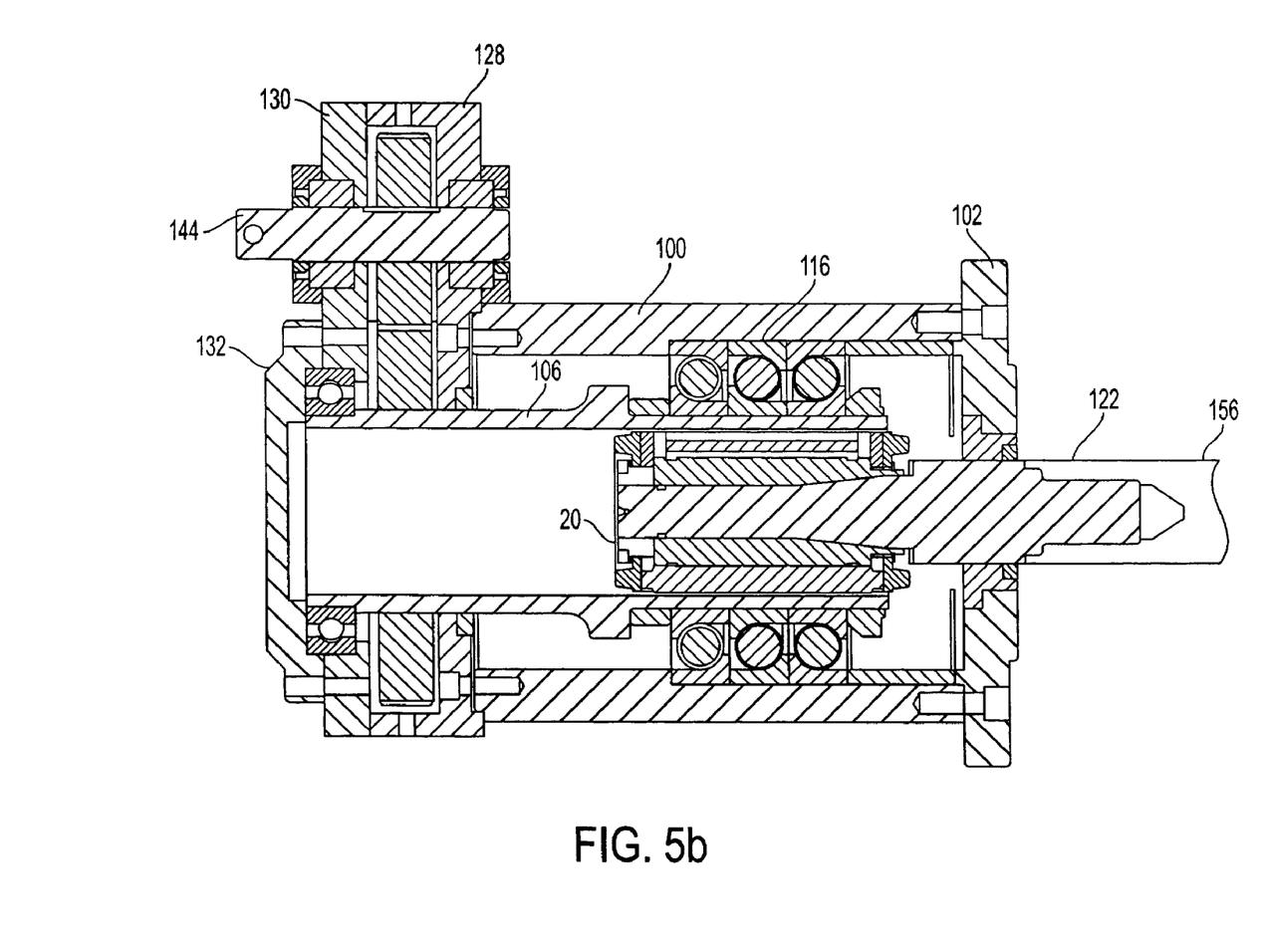
FIG. 5b is a section view of the embodiment of FIG. 5a with the satellite roller screw assembly retracted to the initial operating position.
Figure 5C:
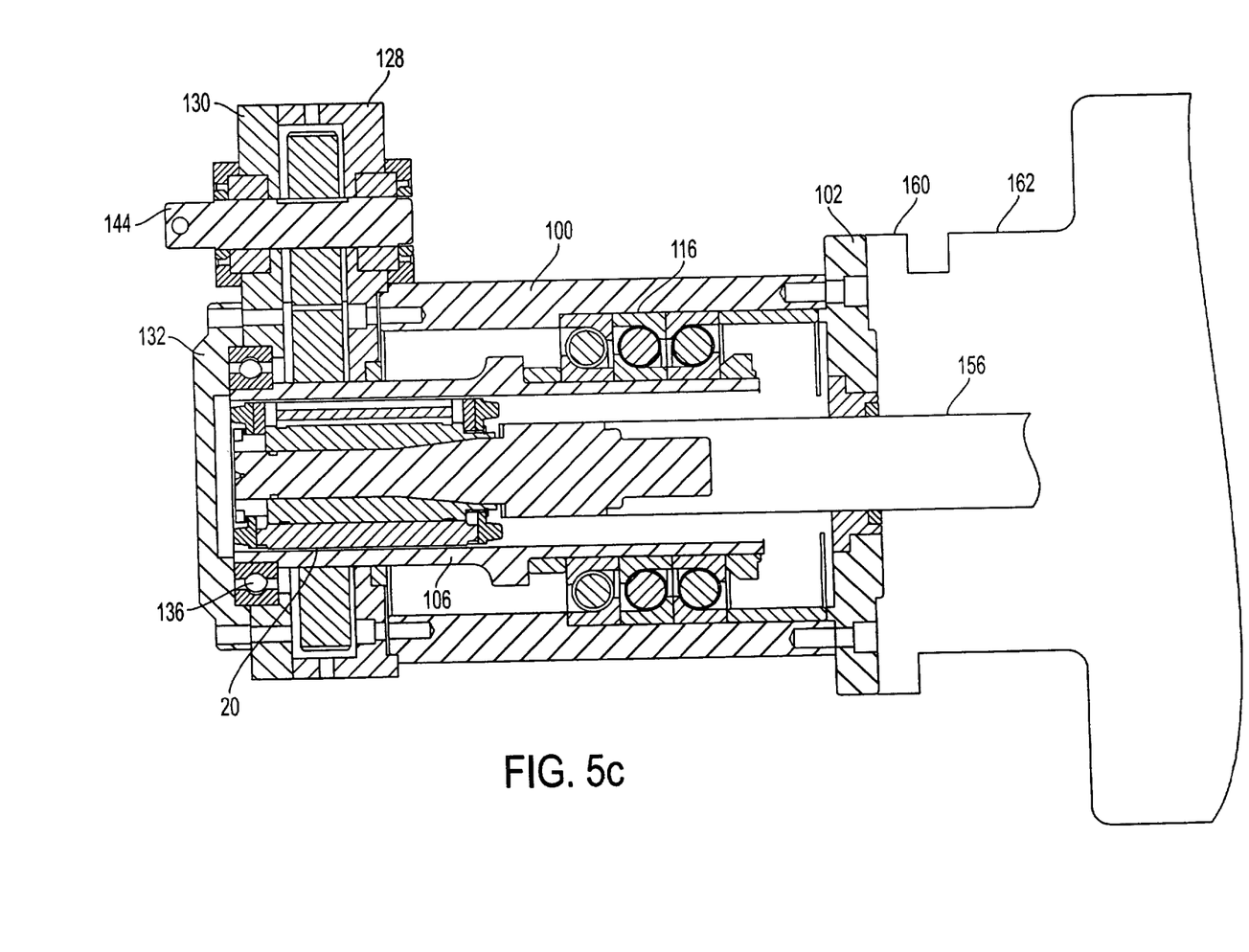
FIG. 5c is a section view of the embodiment of FIG. 5a with the satellite roller screw assembly in the fully withdrawn operating position.
Figure 6:
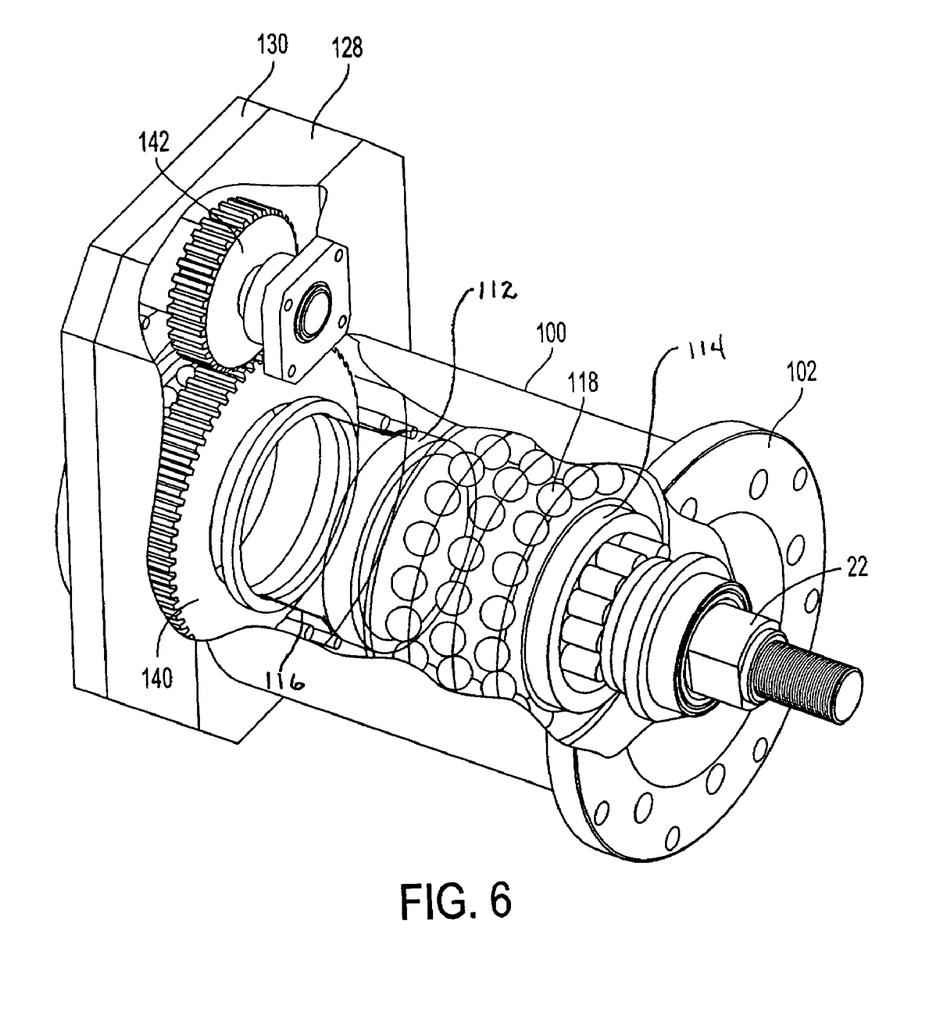

After assembly for normal operation, the roller screw assembly is retracted to an initial extended position as shown in FIG. 5b. In this position, the roller screw assembly is fully engaged with the cylinder and the roller rod is withdrawn to place the end of the mating stem in substantial alignment with the front flange. A mating flange 160 on the valve gate housing 162 is attached to the front flange to secure the operator to the valve housing. Rotation of the input shaft can then be accomplished to rotate the cylinder, retracting the roller screw assembly into the cylinder and drawing the mating stem through the aperture in the front flange to actuate the valve gate. FIG. 5c shows the operator in the fully retracted position. Operation of the first embodiment is comparable to the process described for the second embodiment.

Applications of the second embodiment of the inventive operator are intended for 100,000 lbs thrust delivery and have been demonstrated for 80,000 lbs thrust requirements. In this application, the estimated torque on at the roller screw is 325 ft-lbs. With a 2:1 spur gear reduction, a torque of 170 ft-lbs is required at the input shaft. A total operational stroke of 8.25 inches is provided with a 2.0 inch over extension for assembly.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A high thrust valve operator comprising:
   a bearing housing closed at a first end with a rear flange and at a second end with a front flange, the rear flange having a first aperture, the front flange having a second aperture;
   a cylinder having a threaded internal surface carried within the bearing housing, the cylinder length providing a relief plenum from the front flange;
   a roller screw assembly operably engaging the threaded internal surface of the cylinder and having a roller rod extending therefrom, said roller rod closely receivable within the second aperture, the roller screw assembly movable from an over extended position, encroaching into the relief plenum, to an initial extended position and further movable to a fully retracted position by rotation of the cylinder;

an input shaft received through the first aperture in the rear flange; and means for engaging the input shaft with the cylinder.

2. A high thrust valve operator as defined in claim 1 further comprising:

at least one first bearing assembly supporting the cylinder from the bearing housing positioned adjacent a first end of the cylinder proximate the relief plenum; and at least one second bearing assembly supporting the cylinder from the bearing housing positioned adjacent a second end of the cylinder.

3. A high thrust valve operator as defined in claim 1 wherein the roller screw assembly comprises:

a plurality of satellite rollers each having a translation thread formed over a substantial portion of the roller and at least one synchronization gear;

a roller assembly core receiving the plurality of satellite rollers on an outside surface, said core incorporating at least one master synchronization gear engaging the at least one synchronization gear on each satellite roller, the roller rod being received within a bore in the assembly core; and means for rotatably securing the plurality of satellite rollers to the roller assembly core.

4. A high thrust valve operator as defined in claim 1 wherein the roller rod incorporates:

a first threaded end to receive a mating stem for a valve gate, and a first body portion adjacent the first threaded end and including means for receiving an attachment tool, said first body portion exposed beyond the front flange with the roller screw assembly in the over extended position.

5. A high thrust valve operator as defined in claim 4 wherein the roller rod further incorporates:

a second body portion received and closely engaged by the bore in the roller assembly core, and a second threaded portion adjacent the second body portion and distal the first threaded end, said second threaded portion engaging a tensioning nut.

6. A high thrust valve operator as defined in claim 5 wherein the second body portion is tapered and the bore in the roller assembly core has a matching taper for frictional engagement of the second body portion upon tightening of the tensioning nut.

7. A high thrust valve operator as defined in claim 5 wherein the second body portion is a D-section and the bore in the roller assembly core has a matching D-section for engagement of the roller rod in rotation and the first body portion incorporates a shoulder received against a side surface of the roller assembly core adjacent the bore.

8. A high thrust valve operator as defined in claim 4 wherein the attachment tool receiving means comprises wrench flats machined on the first body portion.

9. A high thrust valve operator as defined in claim 4 wherein the roller rod further incorporates a pilot diameter land intermediate the first threaded portion and the first body portion.

10. A high thrust valve operator as defined in claim 1 wherein the input shaft extends through the first aperture into the cylinder concentric with the cylinder and the means for engaging the cylinder comprises a keyless shrink disc locking device received over the input shaft and within the cylinder for frictional engagement.

11. A high thrust valve operator as defined in claim 1 further wherein the first aperture is offset from the cylinder and the means for engaging the cylinder comprises an input spur gear attached to the input shaft and a cylinder spur gear attached to the cylinder and engaging the input spur gear.

12. A high thrust valve operator as defined in claim 11 wherein the cylinder spur gear engages the cylinder with a keyless shrink disc locking device.

\* \* \* \* \*